United States Patent
Zhang et al.

(10) Patent No.: US 12,523,802 B2
(45) Date of Patent: Jan. 13, 2026

(54) SPLICING DISPLAY MODULE AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Ming Zhang, Hubei (CN); Cui Zhang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 317 days.

(21) Appl. No.: 18/459,011

(22) Filed: Aug. 30, 2023

(65) Prior Publication Data

US 2024/0134093 A1    Apr. 25, 2024
US 2024/0230964 A9    Jul. 11, 2024

(30) Foreign Application Priority Data

Oct. 25, 2022    (CN) .......................... 202211313900.2

(51) Int. Cl.
*G02B 5/02* (2006.01)
(52) U.S. Cl.
CPC .................. *G02B 5/0242* (2013.01)
(58) Field of Classification Search
CPC .............................. G02B 5/0242; G09F 9/302
See application file for complete search history.

(56) References Cited

U.S. PATENT DOCUMENTS

| | | | |
|---|---|---|---|
| 2016/0238785 A1* | 8/2016 | Park | G02B 6/0068 |
| 2016/0363291 A1* | 12/2016 | Sun | G02B 5/0278 |
| 2018/0052312 A1* | 2/2018 | Jia | G02F 1/13336 |
| 2022/0162856 A1* | 5/2022 | Yeo | F21V 21/048 |

OTHER PUBLICATIONS

Office Action issued in corresponding Chinese Patent Application No. 202211313900.2, dated May 27, 2025, with English translation provided; total 29 pages provided.

* cited by examiner

*Primary Examiner* — Mariam Qureshi
(74) *Attorney, Agent, or Firm* — HSML P.C.

(57) ABSTRACT

The present invention embodiment discloses a splicing display module and a display device. The splicing display module includes at least two first display regions and a splicing region located between adjacent two of the first display regions. The splicing display module includes at least two display panels and optical parts. Each display panel includes a display portion and a non-display portion located around the display portion. The display portion includes a planar display sub-portion and a curved surface display sub-portion. The curved surface display sub-portion corresponds to the splicing region. The planar display sub-portion corresponds to the first display region. The optical part corresponds to the curved surface display sub-portion and is located on a light exiting side of the curved surface display sub-portion to refract light emitted from the curved surface display sub-portion to be along a direction away from the first display region of a corresponding display panel.

18 Claims, 9 Drawing Sheets

SPLICING DISPLAY MODULE AND DISPLAY DEVICE

CROSS-REFERENCE TO RELATED APPLICATION

The present invention claims a priority of a Chinese patent application No. 202211313900.2, titled "SPLICING DISPLAY MODULE AND DISPLAY DEVICE", filed with the China National Intellectual Property Administration (CNIPA) on Oct. 25, 2022, in which all contents of the aforementioned application are incorporated in the present invention by reference.

FIELD OF INVENTION

The present invention relates to a field of displays, especially to a splicing display module and a display device.

BACKGROUND OF INVENTION

With the rapid advancement of display technology, its size and application scenarios are continuously expanding. Constrained by the limitations of various display module sizes, the utilization of splicing methods to achieve ultra-large displays has been applied in various aspects of life, such as outdoor advertising, sports stadiums, command centers, shopping malls, and other application scenarios. Within the splicing display module, adjacent display panels often exhibit non-displayable regions in the splicing area, referred to as "splicing slits." These splicing slits can impact the display effect of the splicing display module.

As a result, there is an urgent need for a splicing display module and display device to address the aforementioned technical issue.

SUMMARY OF INVENTION

The present invention provides a splicing display module and a display device that can ease a technical issue of a display effect influenced by a splicing slit of a conventional splicing display module.

The present invention provides a splicing display module, comprising at least two first display regions and a splicing region located between adjacent two of the first display regions, wherein the splicing display module comprises:
  at least two display panels, wherein each of the display panels comprises a display portion and a non-display portion located around the display portion, the display portion comprises a planar display sub-portion and a curved surface display sub-portion located around the planar display sub-portion, the curved surface display sub-portion is located between the planar display sub-portion and the non-display portion, the curved surface display sub-portion corresponds to the splicing region, and the planar display sub-portion corresponds to the first display region; and
  optical parts, each of which is located on a light exiting side of the curved surface display sub-portion to refract light emitted from the curved surface display sub-portion to be along a direction away from the first display region of a corresponding one of the display panels.

Preferably, the optical part comprises a refraction functional layer located on the curved surface display sub-portion, the refraction functional layer at least comprises a first optical layer and a second optical layer, and the second optical layer is located on a side of the first optical layer away from the curved surface display sub-portion; and the first optical layer comprises a first sub-layer near the planar display sub-portion, the second optical layer comprises a third sub-layer near the planar display sub-portion, and a refractive index of the first sub-layer is greater than a refractive index of a corresponding portion of the third sub-layer.

Preferably, the first optical layer further comprises a second sub-layer near the non-display portions; the second optical layer further comprises a fourth sub-layer near the non-display portions; and a refractive index of the second sub-layer is less than a refractive index of a corresponding portion of the fourth sub-layer.

Preferably, a gap is defined between the curved surface display sub-portions of adjacent two of the display panels and is defined between the non-display portions of adjacent two of the display panels, and the gap is filled with a filling portion.

Preferably, the filling portion comprises a matrix and a plurality of scattering particles scattered in the matrix.

Preferably, the splicing display module further comprises a supporting block fastening adjacent two of the display panels, the supporting block comprises a supporting portion connected to non-display portions of the display panels and a supplementary portion disposed on supporting portion and inserted in the gap.

Preferably, the gap comprises a first sub-gap corresponding to the curved surface display sub-portion and a second sub-gap corresponding to the non-display portion; and the filling portion is filled in the first sub-gap, and the supplementary portion of the supporting block is filled in the second sub-gap.

Preferably, along a light exiting direction away from the planar display sub-portion, a width of the first sub-gap gradually decreases; and along the light exiting direction away from the planar display sub-portion, a width of the second sub-gap gradually increases, or the width of the second sub-gap keeps constant.

Preferably, the splicing display module further comprises at least one light converging layer located on a side of the filling portion away from the display panels; and a refractive index of the light converging layer nearest a side of the filling portion is greater than a refractive index of the filling portion, and along a light exiting direction, refractive indexes of adjacent two of the light converging layers increase.

Preferably, the splicing display module further comprises a cover plate layer covering the first display regions and the splicing region.

Preferably, the optical part is disposed on the light exiting side of the curved surface display sub-portion, the optical part comprises a plurality of optical micro-structures, and each of the optical micro-structures is a protrusion or a depression.

Preferably, the splicing display module further comprises an electrical connection part disposed to correspond to adjacent two of the non-display portions of adjacent two of the display panels; and the electrical connection part comprises at least two terminals disposed to correspond to two of the non-display portions and a conductive part located between corresponding two terminals of two of the non-display portions.

Preferably, the non-display portion is connected to the curved surface display sub-portion; the non-display portion comprises a planar non-display sub-portion, the planar non-display sub-portion is tangentially connected to the curved surface display sub-portion, and the planar non-display sub-portion is perpendicular to the planar display sub-portion; or the non-display portion comprises a planar non-display sub-portion and a curved surface non-display sub-portion, the curved surface non-display sub-portion is connected to the curved surface display sub-portion, the planar non-display sub-portion is disposed on a light exiting side of away from the planar display sub-portion, and the planar non-display sub-portion is parallel to the planar display sub-portion.

The present invention further provides a display device comprising any one of the splicing display module and the device main body as described above, and the splicing display module and the device main body are combined integrally.

The present invention further provides a splicing display module, comprising at least two first display regions and a splicing region located between adjacent two of the first display regions, wherein the splicing display module comprises:

at least two display panels, wherein each of the display panels comprises a display portion and a non-display portion located around the display portion, the display portion comprises a planar display sub-portion and a curved surface display sub-portion located around the planar display sub-portion, the curved surface display sub-portion is located between the planar display sub-portion and the non-display portion, the curved surface display sub-portion corresponds to the splicing region, and the planar display sub-portion corresponds to the first display region; and optical parts, each of which is located on a light exiting side of the curved surface display sub-portion to refract light emitted from the curved surface display sub-portion to be along a direction away from the first display region of a corresponding one of the display panels;

wherein the optical part comprises a refraction functional layer located on the curved surface display sub-portion, the refraction functional layer at least comprises a first optical layer and a second optical layer, and the second optical layer is located on a side of the first optical layer away from the curved surface display sub-portion;

wherein the first optical layer comprises a first sub-layer near the planar display sub-portion, the second optical layer comprises a third sub-layer near the planar display sub-portion, and a refractive index of the first sub-layer is greater than a refractive index of a corresponding portion of the third sub-layer;

wherein the first optical layer further comprises a second sub-layer near the non-display portions;

wherein the second optical layer further comprises a fourth sub-layer near the non-display portions;

wherein a refractive index of the second sub-layer is less than a refractive index of a corresponding portion of the fourth sub-layer;

wherein a gap is defined between the curved surface display sub-portions of adjacent two of the display panels and is defined between the non-display portions of adjacent two of the display panels, and the gap is filled with a filling portion.

Preferably, the filling portion comprises a matrix and a plurality of scattering particles scattered in the matrix.

Preferably, the splicing display module further comprises a supporting block fastening adjacent two of the display panels, the supporting block comprises a supporting portion connected to non-display portions of the display panels and a supplementary portion disposed on supporting portion and inserted in the gap.

Preferably, the gap comprises a first sub-gap corresponding to the curved surface display sub-portion and a second sub-gap corresponding to the non-display portion; and the filling portion is filled in the first sub-gap, and the supplementary portion of the supporting block is filled in the second sub-gap.

Preferably, along a light exiting direction away from the planar display sub-portion, a width of the first sub-gap gradually decreases; and along the light exiting direction away from the planar display sub-portion, a width of the second sub-gap gradually increases, or the width of the second sub-gap keeps constant.

Preferably, the splicing display module further comprises at least one light converging layer located on a side of the filling portion away from the display panels; and a refractive index of the light converging layer nearest a side of the filling portion is greater than a refractive index of the filling portion, and along a light exiting direction, refractive indexes of adjacent two of the light converging layers increase.

Advantages of the present invention: The present invention disposes optical parts on a light exiting side of the curved surface display sub-portion to refract light emitted from the curved surface display sub-portion to be along a direction away from the first display region of a corresponding one of the display panels to make display light of the curved surface display sub-portion radiated to the splicing slit of corresponding to the splicing region to decrease a size of the splicing slit and improve a display effect of the splicing display module.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may also acquire other figures according to the appended figures without any creative effort.

DETAILED DESCRIPTION OF PREFERRED EMBODIMENTS

Figure 1:
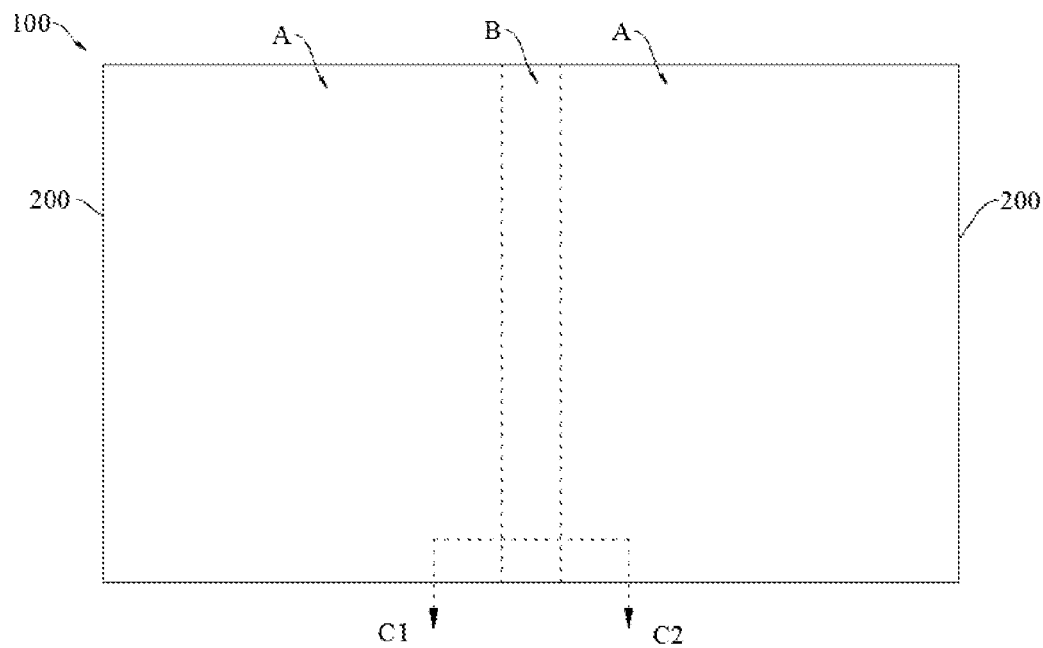
FIG. 1 is a schematic top structural view of a splicing display module provided by an embodiment of the present invention.

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application. In addition, it should be understood that the specific embodiments described here are only used to illustrate and explain the present application, and are not used to limit the present application. In the present application, the used orientation terminologies such as "upper" and "lower", when not specified to the contrary explanation, usually refer to the upper and lower states of the device in actual use or working conditions, specifically according to the direction of the figures in the drawings. Furthermore, "inner" and "outer" refer to the outline of the device.

With the rapid advancement of display technology, its size and application scenarios are continuously expanding. Constrained by the limitations of various display module sizes, the utilization of splicing methods to achieve ultra-large displays has been applied in various aspects of life, such as outdoor advertising, sports stadiums, command centers, shopping malls, and other application scenarios. Within the splicing display module, adjacent display panels often exhibit non-displayable regions in the splicing area, referred to as "splicing slits." These splicing slits can impact the display effect of the splicing display module.

With reference to FIGS. 1 to 11, an embodiment of the present invention provides a splicing display module 100 comprising at least two first display regions A and a splicing region B located between adjacent two of the first display regions A, the splicing display module 100 comprises:

at least two display panels 200, wherein each of the display panels 200 comprises a display portion 210 and a non-display portion 220 located around the display portion 210, the display portion 210 comprises a planar display sub-portion 211 and a curved surface display sub-portion 212 located around the planar display sub-portion 211, the curved surface display sub-portion 212 is located between the planar display sub-portion 211 and the non-display portion 220, the curved surface display sub-portion 212 corresponds to the splicing region B, and the planar display sub-portion 211 corresponds to the first display regions A; and optical parts 300 corresponding to the curved surface display sub-portions 212, wherein each of the optical parts 300 is located on a light exiting side of the curved surface display sub-portion 212 to refract light emitted from the curved surface display sub-portion 212 to be along a direction away from the first display region A corresponding to the display panel 200.

The present invention disposes optical parts on a light exiting side of the curved surface display sub-portion to refract light emitted from the curved surface display sub-portion to be along a direction away from the first display region of a corresponding one of the display panels to make display light of the curved surface display sub-portion radiated to the splicing slit of corresponding to the splicing region to decrease a size of the splicing slit and improve a display effect of the splicing display module.

Technical solutions of the present invention are described in combination with specific embodiments.

Figure 2:
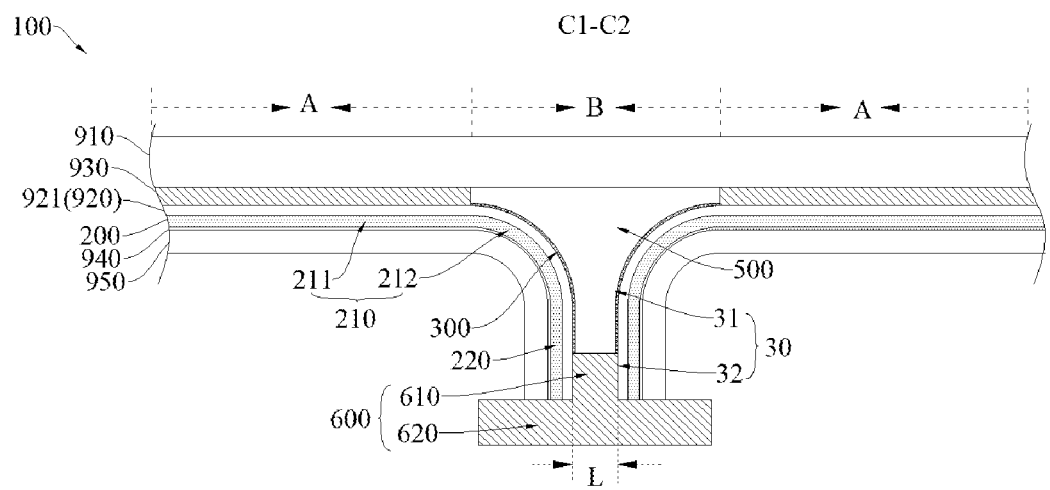
FIG. 2 is a first schematic cross-sectional view along line C1-C2 in FIG. 1.
Figure 3:
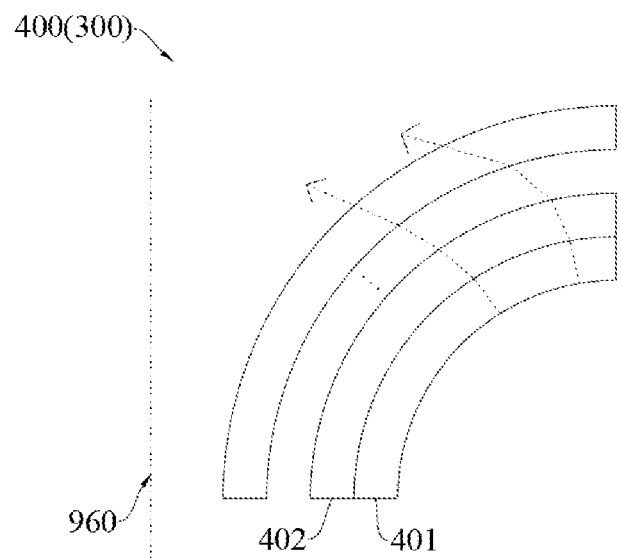
FIG. 3 is a first schematic enlarged view of a refraction functional layer in FIG. 2.

In the present embodiment, with reference to FIGS. 1 to 3, the splicing display module 100 comprises at least two first display regions A and a splicing region B located between adjacent two of the first display regions A, the splicing display module 100 comprises at least two display panels 200 and optical parts 300. Each of the display panels 200 comprises a display portion 210 and the non-display portion 220 located around the display portion 210. The display portion 210 comprises a planar display sub-portion 211 and a curved surface display sub-portion 212 located around the planar display sub-portion 211. The curved surface display sub-portion 212 is located between the planar display sub-portion 211 and the non-display portion 220. The curved surface display sub-portion 212 corresponds to the splicing region B. The planar display sub-portion 211 corresponds to the first display regions A. The optical parts 300 corresponds to the curved surface display sub-portion 212 and is located on the light exiting side of the curved surface display sub-portion 212 to refract light emitted from the curved surface display sub-portion 212 to be along a direction away from the first display regions A corresponding to the display panels 200.

Light emitted from the curved surface display sub-portion 212 is not easy to reach a central line corresponding to the splicing region B so a distance between a point position of display light of the curved surface display sub-portion 212 to a cover plate layer 910 of the splicing display module 100 and a point position of a middle line of the splicing region B corresponding to the cover plate layer 910 of the splicing display module 100 corresponds to a splicing slit. With reference to FIGS. 2 and 3, the middle line of the splicing region B is indicated by a reference character "960". The optical part 300 is utilized to refract light emitted from the curved surface display sub-portion 212 from a direction corresponding to the first display region A to a direction corresponding to the splicing region B to make the display light of the curved surface display sub-portion 212 to be nearer the central line corresponding to the splicing region B such that the splicing region B has a display effect to decrease a size of the splicing slit and improve a display effect of the splicing display module 100.

In some embodiments, the curved surface display sub-portion 212 is always a curved surface no matter what state of the display panel 200 is.

In some embodiments, with reference to FIGS. 2 and 3, the optical part 300 comprises a refraction functional layer 400 located on the curved surface display sub-portion 212. The refraction functional layer 400 at least comprises a first optical layer 401 and a second optical layer 402. the first optical layer 401 is located on the light exiting side of the curved surface display sub-portion 212, the second optical layer 402 is located on a side of the first optical layer 401 away from the curved surface display sub-portion 212. The first optical layer 401 comprises a first sub-layer 410 near a corresponding one of the planar display sub-portions 211. The second optical layer 402 comprises a third sub-layer 430 near a corresponding one of the planar display sub-portions 211, and a refractive index of the first sub-layer 410 is greater than a refractive index of a corresponding portion of the third sub-layer 430.

The optical parts 300 can comprise the refraction functional layer 400. The refraction functional layer 400 comprising the first optical layer 401 and the second optical layer 402 is taken as an example, the second optical layer 402 is nearer a side of human's eyes, the refractive index of the first sub-layer 410 is greater than a refractive index of a corresponding portion of the third sub-layer 430 such that when light emitted from the curved surface display sub-portion 212 passes through the first sub-layer 410 and the third sub-layer 430, light is refracted from a direction corresponding to the first display regions A to a direction corresponding to the splicing region B to make the display light of the curved surface display sub-portion 212 nearer the central line corresponding to the splicing region B to decrease a size of the splicing slit and improve a display effect of the splicing display module 100.

In the present specification, refractive index comparison can be understood as refractive index comparison between corresponding film layers in contact with each other. When light passes through film layers of different refractive indexes, refraction occurs. A light path from a film layer with a low refractive index to a film layer with a high refractive index film layer can be indicated by a refraction of light along a direction toward a normal of the film layer of a larger refractive index. A normal of the film layer of a larger refractive index indicates a line perpendicular to a contact surface of two film layers of different refractive indexes, vice versa.

Figure 4:
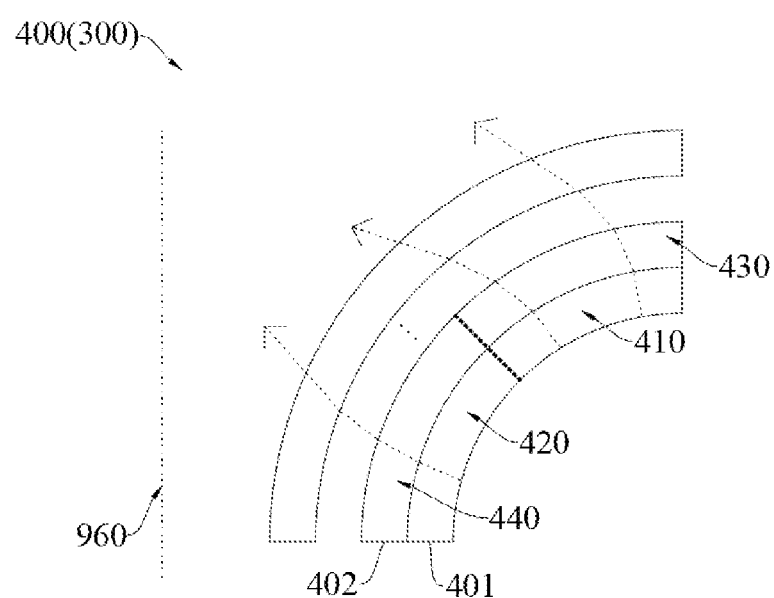
FIG. 4 is a second schematic enlarged view of the refraction functional layer in FIG. 2.

In some embodiments, with reference to FIGS. 1 to 2 and 4, the first optical layer 401 comprises a first sub-layer 410 near a corresponding one of the planar display sub-portions 211 and a second sub-layer 420 near the non-display portions 220. The second optical layer 402 comprises a third sub-layer 430 near a corresponding one of the planar display sub-portions 211 and a fourth sub-layer 440 near the non-display portions 220. A refractive index of the second sub-layer 420 is less than a refractive index of a corresponding portion of the fourth sub-layer 440.

A portion of the display portion 210, that can be highly efficiently utilized by the curved surface display sub-portion 212, is a portion of the display portion 210 near the planar display sub-portion 211. Therefore, a refractive index difference between the first sub-layer 410 and the third sub-layer 430 is utilized to optimize the portion of the display portion 210 that can be highly efficiently utilized by the curved surface display sub-portion 212 such that display light of the curved surface display sub-portion 212 near the planar display sub-portion 211 is nearer the central line corresponding to the splicing region B to improve the display effect. Furthermore, the curved surface display sub-portion 212 is a portion away from the planar display sub-portion 211. Therefore, a refractive index difference between the second sub-layer 420 and the fourth sub-layer 440 is utilized to make light emitted out from the curved surface display sub-portion 212 away from the planar display sub-portion 211 more perpendicularly, which increases display brightness of the splicing region B to reduce shadow of the splicing slit to decrease a size of the splicing slit and improve a display effect of the splicing display module 100.

In some embodiments, with reference to FIGS. 2 and 3, the first optical layer 401 comprises a first sub-layer 410 near a corresponding one of the planar display sub-portions 211, and the second optical layer 402 comprises a third sub-layer 430 near a corresponding one of the planar display sub-portions 211. Along a direction from the planar display sub-portion 211 to the non-display portion 220, a difference between a refractive index of each portion of a side of the first sub-layer 410 near the third sub-layer 430 and a refractive index of a corresponding portion of a side of the third sub-layer 430 near the first sub-layer 410 gradually decreases.

Display light of a side of the curved surface display sub-portion 212 near the planar display sub-portion 211 can be refracted more toward the central line corresponding to the splicing region B. Display light of a side of the curved surface display sub-portion 212 away from the planar display sub-portion 211 excessively refracted toward the middle line of the splicing region B would cause failure of emission of display light, resulting in a lowered utilization of display light. Therefore, along a direction from the planar display sub-portion 211 to the non-display portion 220, a difference between the refractive index of the first sub-layer 410 and the refractive index of a corresponding portion of the third sub-layer 430 gradually decreases to further balance a relationship between display light of the curved surface display sub-portion 212 near the planar display sub-portion 211 and away from the planar display sub-portion 211 and the splicing slit of the splicing region B to decrease a size of the splicing slit and improve a display effect of the splicing display module 100.

In some embodiments, with reference to FIG. 4, each of the first sub-layer 410 and the second sub-layer 420 occupies half an area of the first optical layer 401, and each of the third sub-layer 430 and the fourth sub-layer 440 occupies half an area of the second optical layer 402.

Namely, when a cross-section profile of the curved surface display sub-portion 212 is a quarter circle, a cross-section profile of the first sub-layer 410 is a one-eighth circle, and a cross-section profile of the second sub-layer 420 is a one-eighth circle to balance a relationship between display light of the curved surface display sub-portion 212 near the planar display sub-portion 211 and away from the planar display sub-portion 211 and the splicing slit of the splicing region B to decrease a size of the splicing slit and improve a display effect of the splicing display module 100.

In some embodiments, the refraction functional layer 400 comprises a multi-layer optical layer. Along a light exiting direction of the curved surface display sub-portion 212, a refractive index of the multi-layer optical layer of the refraction functional layer 400 decreases first and then increases.

Namely, in the refraction functional layer 400, a transmission path of the display light of the curved surface display sub-portion 212 is refracted toward a horizontal direction, and then is refracted toward a vertical direction. Both the horizontal direction and the vertical direction are according to the splicing display module 100, light refraction toward the horizontal direction can decrease a size of the splicing slit of the splicing region B. Light refraction toward the vertical direction can increase display brightness of the splicing region B to balance a relationship between the splicing slit of the splicing region B and the display brightness of the splicing region B to decrease a size of the splicing slit and improve a display effect of the splicing display module 100.

In some embodiments, the refraction functional layer 400 can be directly bonded, and can be formed by evaporation, and no limit is here.

In some embodiments, the display panels 200 further comprises a fill light display sub-portion located between the non-display portion 220 and the curved surface display sub-portion 212.

The fill light display sub-portion can emit white light to increase display brightness of the splicing region B, which reduces a shadow of the splicing slit to decrease a size of the splicing slit and improve a display effect of the splicing display module 100.

Figure 5:
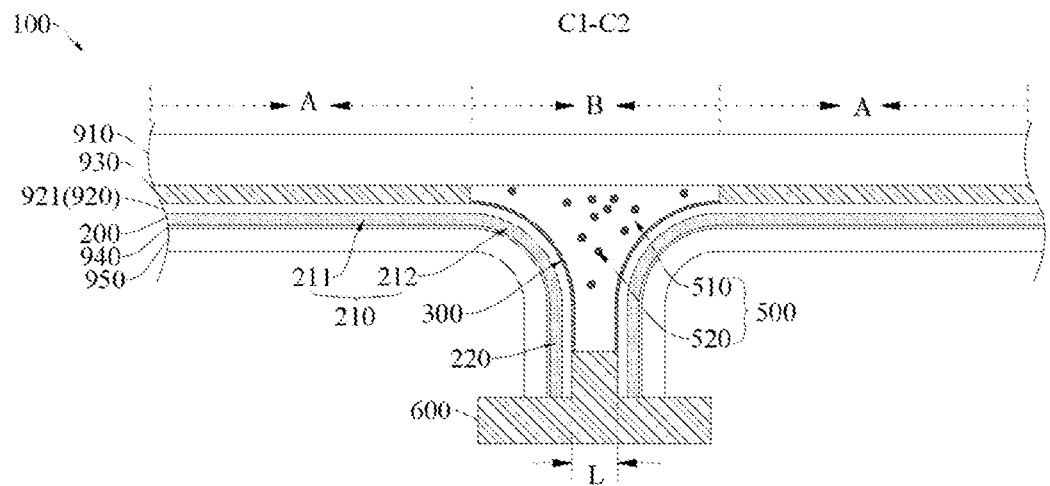
FIG. 5 is a second schematic cross-sectional view along line C1-C2 in FIG. 1.
Figure 7:
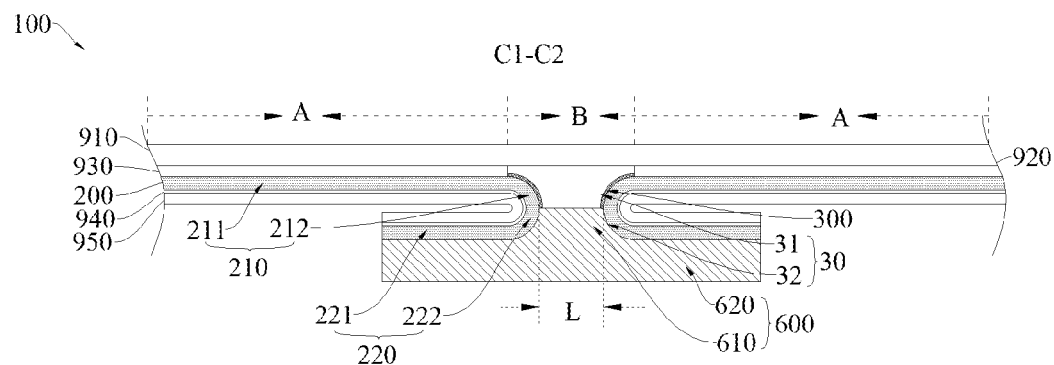
FIG. 7 is a fourth schematic cross-sectional view along line C1-C2 in FIG. 1.

In some embodiments, with reference to FIGS. 2, 5, and 7, a gap 30 is defined between the curved surface display sub-portions 212 of adjacent two of the display panels 200 and is defined between the non-display portions 220 of adjacent two of the display panels 200. The gap 30 is filled with a filling portion 500.

The filling portion 500 corresponds to the splicing region B. Because the curved surface display sub-portion 212 is an arc surface, the gap 30 with a stepped difference is formed between adjacent two of the display panels 200. The filling portion 500 is configured to planarize the gap 30 with a stepped difference to have a more planarized formation condition during forming the cover plate layer 910 to improve entire film layer flatness of the splicing display module 100.

In some embodiments, with reference to FIG. 5, the filling portion 500 comprises a matrix 510 and a plurality of scattering particles 520 scattered in the matrix 510.

The matrix 510 can be organic material, and the scattering particles 520 can be high refractive index nanoparticles. The scattering particles 520 can increase light uniformity of the curved surface display sub-portion 212 in the splicing region B to mitigate the splicing slit, which reduces the shadow of the splicing slit to decrease a size of the splicing slit and improve a display effect of the splicing display module 100.

In some embodiments, the matrix 510 can be various monomers, oligomers, polymers, and a mixture thereof that can be in form of free radical polymerization, concentrations and/or types of compositions of the matrix and/or can be adjusted to control a film layer refractive index.

In some embodiments, the scattering particles 520 can be a combination of one or more compounds as follows: zirconia (ZrO2), titanium dioxide (TiO2), antimony oxide, aluminum oxide, tin oxide, etc., and it can be a mixed metal oxide. A refractive index of the material ranges from 1.6 to 3.0. For example, titanium dioxide (TiO2) particles has a very high refractive index of 2.6-2.9.

In some embodiments, a concentration of the scattering particles and a type of metal oxide can be adjusted to control a film layer refractive index.

In some embodiments, with reference to FIGS. 2 and 7, the splicing display module 100 further comprises a supporting block 600 fastening adjacent two of the display panels 200. The supporting block 600 comprises a supporting portion 610 connected to the non-display portion 220 of the display panels 200 and a supplementary portion 620 disposed on the supporting portion 610 and inserted in the gap 30.

The supporting block 600 is configured to fasten adjacent two of the display panels 200 and simultaneously carry material of the filling portion 500 while the filling portion 500 is being formed. A width of a side of the supplementary portion 620 of the supporting block 600 near the filling portion 500 corresponds to a distance between adjacent two of the curved surface display sub-portions 212 corresponding to adjacent two of the display panels 200. The width of the side of the supplementary portion 620 of the supporting block 600 near the filling portion 500 is indicated by a reference character "L". During fabrication of the splicing display module 100, the fabrication gap 30 of the display panels 200 of the splicing display module 100 can be adjusted by adjusting the width L.

In some embodiments, a width L of a side of the supplementary portion 620 near the filling portion 500 ranges from 0 mm to 10 mm.

In some embodiments, with reference to FIGS. 2 and 7, the gap 30 comprises a first sub-gap 31 corresponding to the curved surface display sub-portion 212 and a second sub-gap 32 corresponding to the non-display portion 220. The filling portion 500 is filled in the first sub-gap 31, and the supplementary portion 620 of the supporting block 600 is filled in the second sub-gap 32.

The supplementary portion 620 is filled in the second sub-gap 32 and carries the filling portion 500 to fill in the first sub-gap 31, which guarantees flatness of the surface of the filling portion 500 away from the curved surface display sub-portion 212 to facilitate disposing a film layer above, for example, disposing the cover plate layer 910.

In some embodiments, with reference to FIGS. 2 and 7, along a light exiting direction away from the planar display sub-portion 211, a width of the first sub-gap 31 gradually decreases. With reference to FIG. 7, along the light exiting direction away from the planar display sub-portion 211, a width of the second sub-gap 32 gradually increases. Alternatively, with reference to FIG. 2, the width of the second sub-gap 32 keeps constant.

Along the light exiting direction away from the planar display sub-portion 211, the width of the first sub-gap 31 gradually decreases, and the curved surface display sub-portion 212 is used to reduce the splicing slit. Along the light exiting direction away from the planar display sub-portion 211, the width of the second sub-gap 32 gradually increases to bend the non-display portion 220 to a rear surface of the splicing display module 100. Along the light exiting direction away from the planar display sub-portion 211, the width of the second sub-gap 32 keeps constant to skip a process for bending the non-display portion 220.

In some embodiments, the curved surface display sub-portion 212 is a quarter circle, and its minimum bending radius is 0.3 mm. A width of a side of the first sub-gap 31 most away from the supporting block is relevant to the bending radius of the curved surface display sub-portion 212 and a width L of a side of the supplementary portion 620 near the filling portion 500. Therefore, a minimum width of a side of the first sub-gap 31 most away from the supporting block is 0.6 mm.

In some embodiments, with reference to FIG. 2, the splicing display module 100 further comprises a backplate 940, a bonding layer, and a support board 950 disposed on the display panels 200 away from the light exiting side.

In some embodiments, a minimum sum of thicknesses of the display panels 200, the backplate 940, the bonding layer, and the support board 950 is 0.4 mm. Therefore, a minimum width of a side of the supporting portion 610 near the supplementary portion 620 is 0.8 mm.

Figure 8:
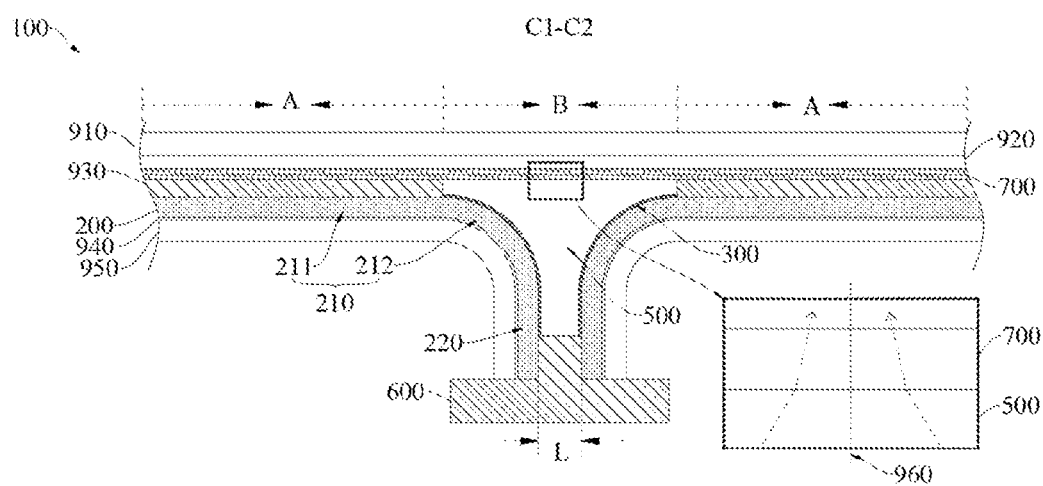
FIG. 8 is a fifth schematic cross-sectional view along line C1-C2 in FIG. 1.

In some embodiments, with reference to FIG. 8, the splicing display module 100 further comprises at least one light converging layer 700 located on a side of the filling portion 500 away from the display panels 200. A refractive index of the light converging layer 700 near a side of the filling portion 500 is greater than a refractive index of the filling portion 500. Along a light exiting direction, in adjacent two of the light converging layers 700, a refractive index of the light converging layer 700 near a side of the filling portion 500 is less than a refractive index of the light converging layer 700 away from a side of the filling portion 500.

The light converging layer 700 is configured to converge light to make light emitted from the curved surface display sub-portion 212 to the splicing region B more perpendicular to be converged toward the middle line of the splicing region B. The middle line of the splicing region B in indicated by a reference character "960", which improves the display light of the curved surface display sub-portion 212 to improve display light of the splicing region B and increase display brightness of the splicing region B to reduce shadow of the splicing slit to decrease a size of the splicing slit and improve a display effect of the splicing display module 100.

In some embodiments, a difference between a refractive index of the light converging layer 700 nearest a side of the filling portion 500 and the refractive index of the filling portion 500 is greater than or equal to 0.4 to effectively increase display brightness of the splicing region B to lower shadow of the splicing slit to decrease a size of the splicing slit and improve a display effect of the splicing display module 100.

In some embodiments, when the light converging layer 700 is multiple layers, a difference between the refractive indexes of adjacent two of the light converging layers 700 is greater than or equal to 0.2 to effectively increase display brightness of the splicing region B to reduce shadow of the splicing slit to decrease a size of the splicing slit and improve a display effect of the splicing display module 100.

Figure 6:
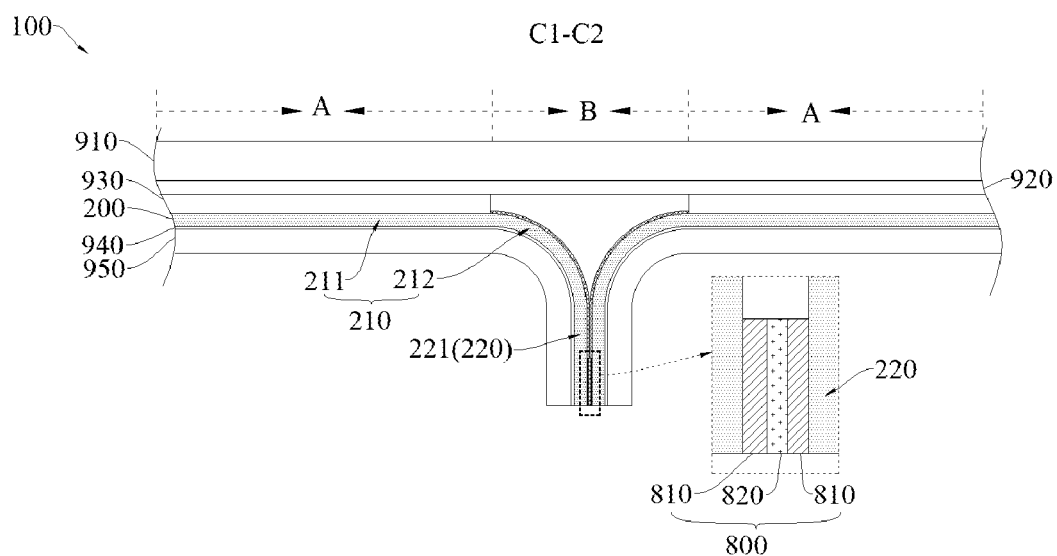
FIG. 6 is a third schematic cross-sectional view along line C1-C2 in FIG. 1.

In some embodiments, with reference to FIGS. 2, 6, and 8, the splicing display module 100 further comprises a cover plate layer 910, the cover plate layer 910 covers the first display regions A and the splicing region B.

After the splicing region B is filled with the filling portion 500, the same cover plate layer 910 is bonded to the first display regions A and the splicing region B, which ensures light exiting surfaces of adjacent two of the display panels 200 in the same level plane to guarantee the display effect.

Figure 9:
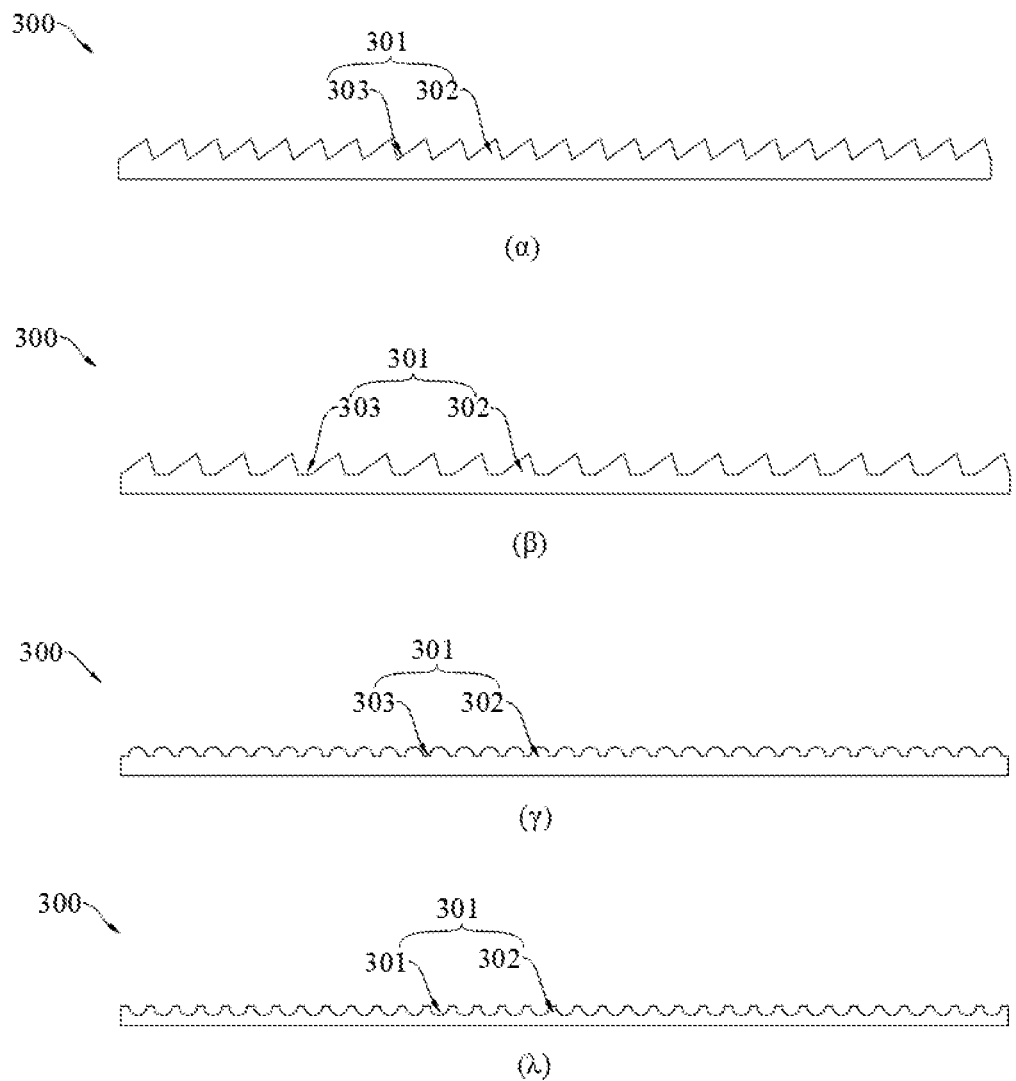
FIG. 9 is a schematic view if four optical micro-structures of an optical part of the splicing display module provided by the embodiment of the present invention.

In some embodiments, with reference to FIG. 9, the optical parts 300 is disposed on the light exiting side of the curved surface display sub-portion 212, the optical part 300 comprises a plurality of optical micro-structures 301, and each of the optical micro-structures 301 is a protrusion 302 or a depression 303.

The optical micro-structures 301 can increase diffusibility of the display light of the curved surface display sub-portion 212 to refract light emitted from the curved surface display sub-portion 212 from a direction corresponding to the first display region A to a direction corresponding to the splicing region B such that the display light of the curved surface display sub-portion 212 is nearer the central line corresponding to the splicing region B to decrease a size of the splicing slit and improves a display effect of the splicing display module 100.

Figure 10A:
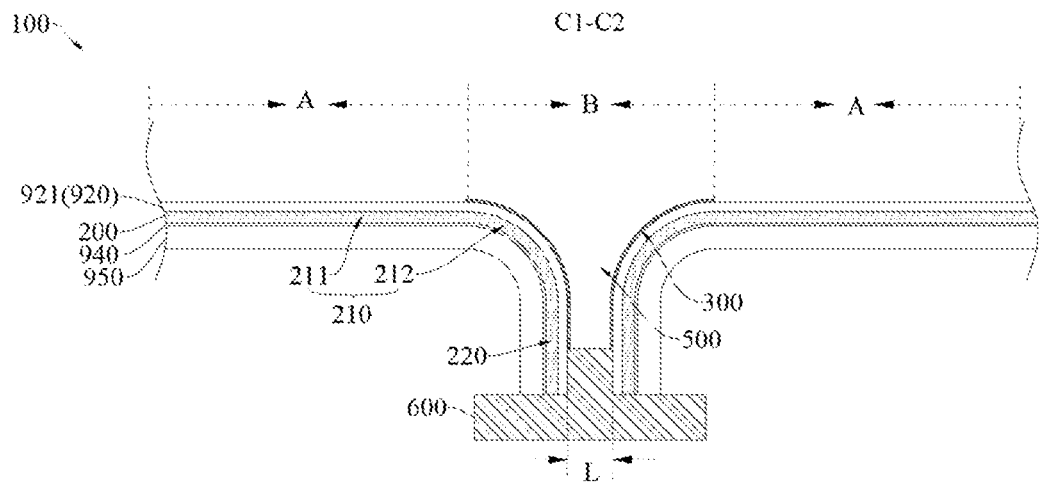
FIGS. 10A to 10C are fabrication flow views of a splicing display module provided by the embodiment of the present invention.
Figure 10B:
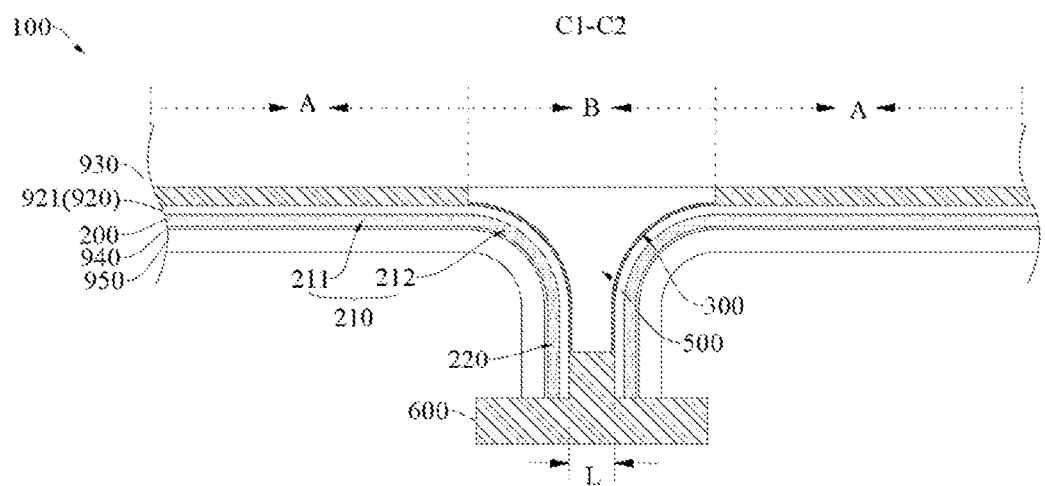
Figure 10C:
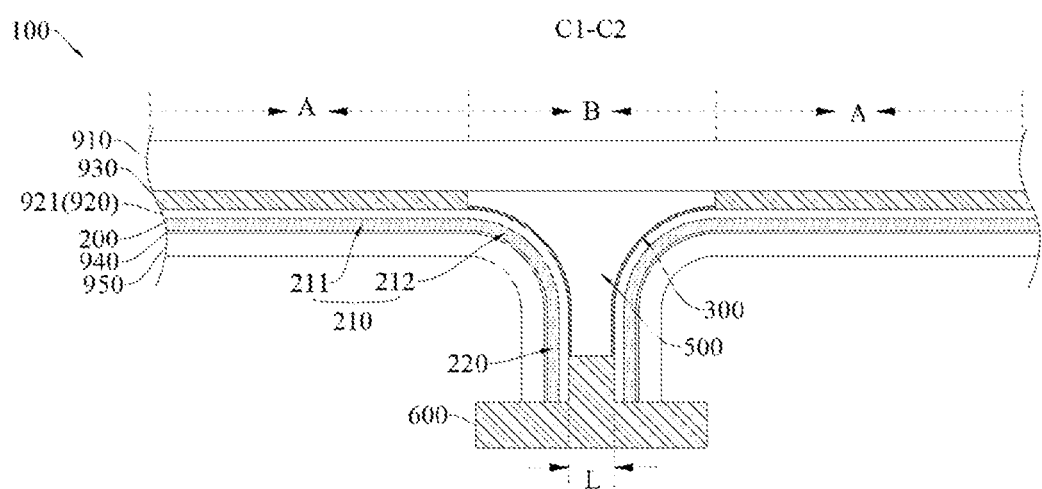

In some embodiments, with reference to FIGS. 10A to 10C, the optical part 300 (the refraction functional layer 400 and/or the optical micro-structures 301) can be formed first, and then the filling portion 500 is formed.

In some embodiments, the non-display portion 220 is connected to the curved surface display sub-portion 212. With reference to FIG. 6, the non-display portion 220 comprises a planar non-display sub-portion 221, the planar non-display sub-portion 221 is connected to the curved surface display sub-portion 212 tangentially, and the planar non-display sub-portion 221 is perpendicular to the planar display sub-portion 211. Alternatively, with reference to FIG. 7, the non-display portion 220 comprises a planar non-display sub-portion 221 and a curved surface non-display sub-portion 222, the curved surface non-display sub-portion 222 is connected to the curved surface display sub-portion 212, the planar non-display sub-portion 221 is disposed on a light exiting side away from the planar display sub-portion 211, and the planar non-display sub-portion 221 is parallel to the planar display sub-portion 211.

The display panels 200 further comprises a bonding wiring board, the bonding wiring board is disposed to correspond to the non-display portion 220, and the non-display portion 220 is bent to a rear surface of the display panels 200 to facilitating disposing the bonding wiring board.

Figure 11:
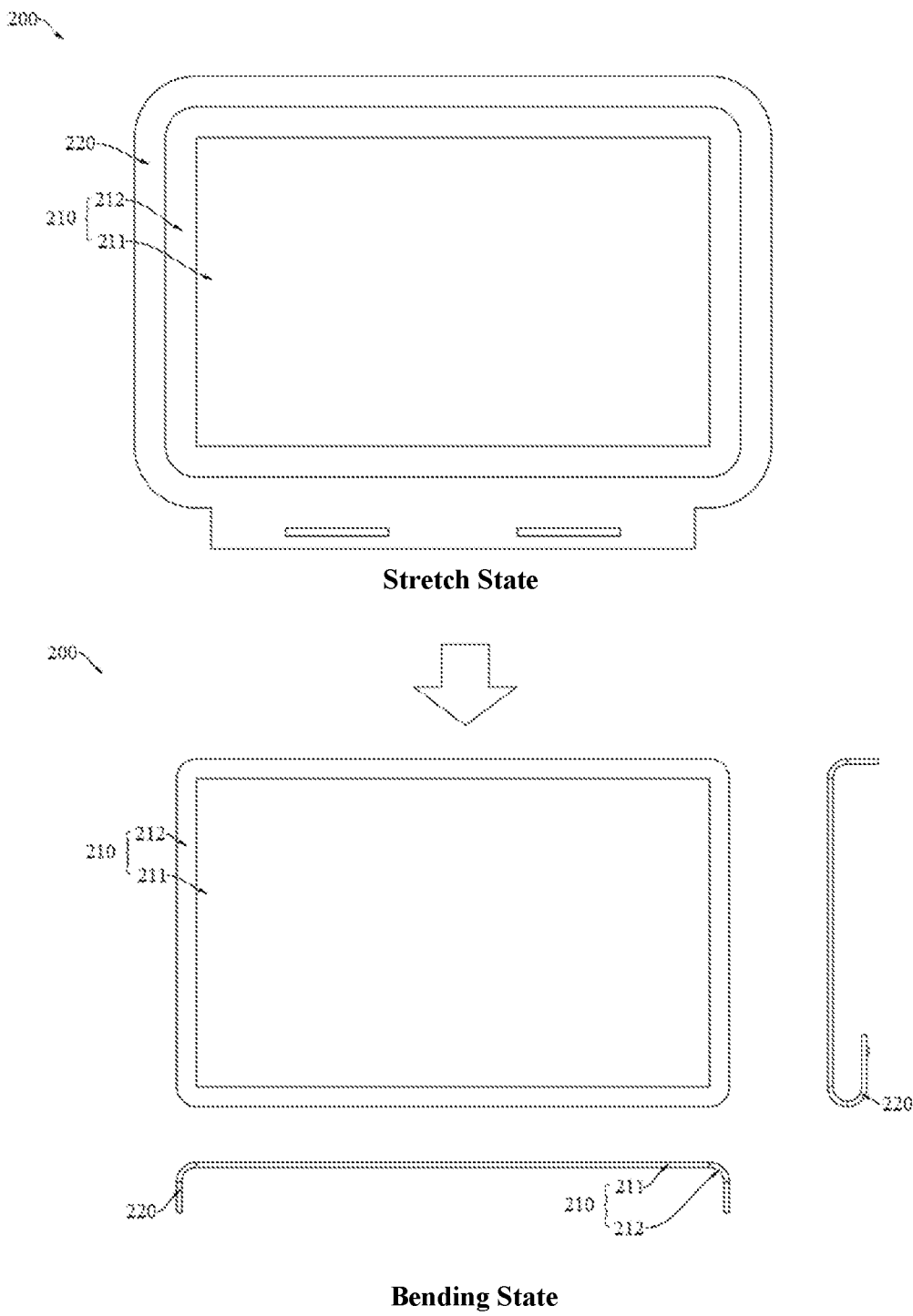
FIG. 11 is a schematic view of a stretch state and a bending state of the display panel of the splicing display module provided by the embodiment of the present invention.

In some embodiments, with reference to FIG. 11, FIG. 11 is a schematic view of a bending state of the curved surface display sub-portion 212 of the display panel of the splicing display module 100.

In some embodiments, with reference to FIG. 6, the splicing display module 100 further comprises an electrical connection part 800, the electrical connection part 800 is disposed to correspond to adjacent two of the non-display portions 220 of adjacent two of the display panels 200. The electrical connection part 800 comprises at least two terminals 810 disposed to correspond to two of the non-display portions 220 and a conductive part 820 located between the two terminals 810 corresponding to two of the non-display portions 220.

The splicing display module 100 further comprises a driver control member, the electrical connection part 800 electrically connects adjacent two of the display panels 200. Adjacent two of the display panels 200 are in electrical contact with each other through the electrical connection part 800. One driver control member can simultaneously control at least two the display panels 200 to reduce a number of the driver control member, which lowers costs.

In some embodiments, material of the conductive part 820 can be an anisotropic conductive film (ACF).

In some embodiments, with reference to FIGS. 2 and 5 to 8, the splicing display module 100 further comprises a polarization layer 920 located between the cover plate layer 910 and the display panel 200.

With reference to FIGS. 6 to 8, the polarization layer 920 can be disposed as an entire layer. Alternatively, with reference to FIGS. 2 and 5, the polarization layer 920 can comprise a plurality of polarizers 921, and the polarizers 921 are disposed to correspond to the display panels 200. The polarization layer 920 can be configured to reduce ambient reflection, which improves the display effect.

In some embodiments, with reference to FIGS. 2 and 5 to 8, the optical part 300 can be disposed on a surface of the curved surface display sub-portion 212, and can be disposed on a surface of the polarizers 921 away from the curved surface display sub-portion 212.

In some embodiments, with reference to FIGS. 2 and 5, the polarization layer 920 can comprise a plurality of polarizers 921, the polarizers 921 are bent to correspond to the display panels 200. The splicing display module 100 further comprises an optical adhesive layer 930 located between the cover plate layer 910 and a corresponding one of the polarizers 921. A surface of the optical adhesive layer 930 away from the display panels 200 is flush with a surface of the filling portion 500 away from the display panels 200, such that the cover plate layer 910 is disposed flat.

Material of the optical adhesive layer 930 can be a regular optical adhesive.

In some embodiments, compensation optimization of image display by algorithm ensures entirety of image display of the splicing region B and the first display regions A, prevents non-display or display distortion of the splicing region B, reduces the splicing slit of the splicing display module 100, and can even realize a seamless display of the splicing display module 100.

The present invention, by optical parts, refracts light emitted from the curved surface display sub-portion from a direction corresponding to the first display region to a direction corresponding to the splicing region to decrease a size of the splicing slit and improve a display effect of the splicing display module.

Figure 12:
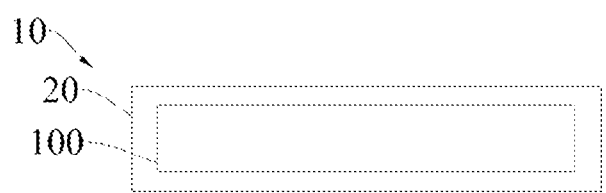
FIG. 12 is a schematic structural view of a display device provided by the embodiment of the present invention.

With reference to FIG. 12, the embodiment of the present invention further provides a display device 10 comprising any one of the above splicing display module 100 and the device main body 20. The splicing display module 100 and the device main body 20 are combined integrally.

A specific structure of the splicing display module 100 refers to embodiment and attached drawings of any one of the above splicing display module 100 and would not be described repeatedly here.

In the present embodiment, the device main body 20 can comprise middle frame, frame sealant, etc., the display device 10 can be a display terminal such as television, giant screen, etc., and would not be limited here.

The present invention embodiment discloses a splicing display module and a display device. The splicing display module includes at least two first display regions and a splicing region located between adjacent two of the first display regions. The splicing display module includes at least two display panels and optical parts. Each display panel includes a display portion and anon-display portion located around the display portion. The display portion includes a planar display sub-portion and a curved surface display sub-portion. The curved surface display sub-portion corresponds to the splicing region. The planar display sub-portion corresponds to the first display region. The optical part corresponds to the curved surface display sub-portion and is located on a light exiting side of the curved surface display sub-portion to refract light emitted from the curved surface display sub-portion to be along a direction away from the first display region of a corresponding one of the display panels. The present invention, by the optical parts, refracts the light emitted from the curved surface display sub-portion to beam along a direction from a direction corresponding to the first display region to a direction corresponding to the splicing region to decrease a size of a splicing slit to improve a display effect of the splicing display module.

The splicing display module and the display device provided by the embodiment of the present invention are described in detail as above. In the specification, the specific examples are used to explain the principle and embodiment of the present application. The above description of the embodiments is only used to help understand the method of the present application and its spiritual idea. Meanwhile, for those skilled in the art, according to the present idea of invention, changes will be made in specific embodiment and application. In summary, the contents of this specification should not be construed as limiting the present application.

What is claimed is:

1. A splicing display module, comprising at least two first display regions and a splicing region located between adjacent two of the first display regions, wherein the splicing display module comprises:
   at least two display panels, wherein each of the display panels comprises a display portion and a non-display portion located around the display portion, the display portion comprises a planar display sub-portion and a curved surface display sub-portion located around the planar display sub-portion, the curved surface display sub-portion is located between the planar display sub-portion and the non-display portion, the curved surface display sub-portion corresponds to the splicing region, and the planar display sub-portion corresponds to the first display region; and
   optical parts, each of which is located on a light exiting side of the curved surface display sub-portion to refract light emitted from the curved surface display sub-portion to be along a direction away from the first display region of a corresponding one of the display panels,
   wherein the optical part comprises a refraction functional layer located on the curved surface display sub-portion, the refraction functional layer at least comprises a first optical layer and a second optical layer, and the second optical layer is located on a side of the first optical layer away from the curved surface display sub-portion,
   wherein the first optical layer comprises a first sub-layer near the planar display sub-portion, the second optical layer comprises a third sub-layer near the planar display sub-portion, and a refractive index of the first sub-layer is greater than a refractive index of a corresponding portion of the third sub-layer,
   wherein the first optical layer further comprises a second sub-layer near the non-display portions,
   wherein the second optical layer further comprises a fourth sub-layer near the non-display portions, and
   wherein a refractive index of the second sub-layer is less than a refractive index of a corresponding portion of the fourth sub-layer.

2. The splicing display module according to claim 1, wherein a gap is defined between the curved surface display sub-portions of adjacent two of the display panels and is defined between the non-display portions of adjacent two of the display panels, and the gap is filled with a filling portion.

3. The splicing display module according to claim 2, wherein the filling portion comprises a matrix and a plurality of scattering particles scattered in the matrix.

4. The splicing display module according to claim 2, wherein the splicing display module further comprises a supporting block fastening adjacent two of the display panels, the supporting block comprises a supporting portion connected to non-display portions of the display panels and a supplementary portion disposed on supporting portion and inserted in the gap.

5. The splicing display module according to claim 4, wherein
   the gap comprises a first sub-gap corresponding to the curved surface display sub-portion and a second sub-gap corresponding to the non-display portion; and
   the filling portion is filled in the first sub-gap, and the supplementary portion of the supporting block is filled in the second sub-gap.

6. The splicing display module according to claim 5, wherein
   along a light exiting direction away from the planar display sub-portion, a width of the first sub-gap gradually decreases; and
   along the light exiting direction away from the planar display sub-portion, a width of the second sub-gap gradually increases, or the width of the second sub-gap keeps constant.

7. The splicing display module according to claim 2, wherein the splicing display module further comprises at least one light converging layer located on a side of the filling portion away from the display panels; and a refractive index of the light converging layer nearest a side of the filling portion is greater than a refractive index of the filling portion, and along a light exiting direction, refractive indexes of adjacent two of the light converging layers increase.

8. The splicing display module according to claim 2, wherein the splicing display module further comprises a cover plate layer covering the first display regions and the splicing region.

9. The splicing display module according to claim 1, wherein the optical part is disposed on the light exiting side of the curved surface display sub-portion, the optical part comprises a plurality of optical micro-structures, and each of the optical micro-structures is a protrusion or a depression.

10. The splicing display module according to claim 1, wherein
the splicing display module further comprises an electrical connection part disposed to correspond to adjacent two of the non-display portions of adjacent two of the display panels; and
the electrical connection part comprises at least two terminals disposed to correspond to two of the non-display portions and a conductive part located between corresponding two terminals of two of the non-display portions.

11. The splicing display module according to claim 1, wherein
the non-display portion is connected to the curved surface display sub-portion;
the non-display portion comprises a planar non-display sub-portion, the planar non-display sub-portion is tangentially connected to the curved surface display sub-portion, and the planar non-display sub-portion is perpendicular to the planar display sub-portion; or
the non-display portion comprises a planar non-display sub-portion and a curved surface non-display sub-portion, the curved surface non-display sub-portion is connected to the curved surface display sub-portion, the planar non-display sub-portion is disposed on a light exiting side of away from the planar display sub-portion, and the planar non-display sub-portion is parallel to the planar display sub-portion.

12. A display device, comprising the splicing display module and the device main body of the splicing display module according to claim 1, and the splicing display module and the device main body are combined integrally.

13. A splicing display module, comprising at least two first display regions and a splicing region located between adjacent two of the first display regions, wherein the splicing display module comprises:
at least two display panels, wherein each of the display panels comprises a display portion and a non-display portion located around the display portion, the display portion comprises a planar display sub-portion and a curved surface display sub-portion located around the planar display sub-portion, the curved surface display sub-portion is located between the planar display sub-portion and the non-display portion, the curved surface display sub-portion corresponds to the splicing region, and the planar display sub-portion corresponds to the first display region; and
optical parts, each of which is located on a light exiting side of the curved surface display sub-portion to refract light emitted from the curved surface display sub-portion to be along a direction away from the first display region of a corresponding one of the display panels;
wherein the optical part comprises a refraction functional layer located on the curved surface display sub-portion, the refraction functional layer at least comprises a first optical layer and a second optical layer, and the second optical layer is located on a side of the first optical layer away from the curved surface display sub-portion;
wherein the first optical layer comprises a first sub-layer near the planar display sub-portion, the second optical layer comprises a third sub-layer near the planar display sub-portion, and a refractive index of the first sub-layer is greater than a refractive index of a corresponding portion of the third sub-layer;
wherein the first optical layer further comprises a second sub-layer near the non-display portions;
wherein the second optical layer further comprises a fourth sub-layer near the non-display portions;
wherein a refractive index of the second sub-layer is less than a refractive index of a corresponding portion of the fourth sub-layer;
wherein a gap is defined between the curved surface display sub-portions of adjacent two of the display panels and is defined between the non-display portions of adjacent two of the display panels, and the gap is filled with a filling portion.

14. The splicing display module according to claim 13, wherein the filling portion comprises a matrix and a plurality of scattering particles scattered in the matrix.

15. The splicing display module according to claim 13, wherein the splicing display module further comprises a supporting block fastening adjacent two of the display panels, the supporting block comprises a supporting portion connected to non-display portions of the display panels and a supplementary portion disposed on supporting portion and inserted in the gap.

16. The splicing display module according to claim 15, wherein
the gap comprises a first sub-gap corresponding to the curved surface display sub-portion and a second sub-gap corresponding to the non-display portion; and
the filling portion is filled in the first sub-gap, and the supplementary portion of the supporting block is filled in the second sub-gap.

17. The splicing display module according to claim 16, wherein
along a light exiting direction away from the planar display sub-portion, a width of the first sub-gap gradually decreases; and
along the light exiting direction away from the planar display sub-portion, a width of the second sub-gap gradually increases, or the width of the second sub-gap keeps constant.

18. The splicing display module according to claim 13, wherein
the splicing display module further comprises at least one light converging layer located on a side of the filling portion away from the display panels; and
a refractive index of the light converging layer nearest a side of the filling portion is greater than a refractive index of the filling portion, and along a light exiting direction, refractive indexes of adjacent two of the light converging layers increase.

* * * * *